United States Patent
Schmidt

(10) Patent No.: US 7,089,432 B2
(45) Date of Patent: Aug. 8, 2006

(54) METHOD FOR OPERATING A PROCESSOR AT FIRST AND SECOND RATES DEPENDING UPON WHETHER THE PROCESSOR IS EXECUTING CODE TO CONTROL PREDETERMINED HARD DRIVE OPERATIONS

(75) Inventor: Thorsten Schmidt, Milpitas, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 488 days.

(21) Appl. No.: 10/413,198

(22) Filed: Apr. 14, 2003

(65) Prior Publication Data

US 2004/0128575 A1 Jul. 1, 2004

Related U.S. Application Data

(60) Provisional application No. 60/436,752, filed on Dec. 27, 2002.

(51) Int. Cl.
*G06F 1/26* (2006.01)
(52) U.S. Cl. .................... 713/300; 713/320; 713/322
(58) Field of Classification Search ............... 713/300, 713/322, 320; 369/44.11
See application file for complete search history.

(56) References Cited

U.S. PATENT DOCUMENTS

| | | | | |
|---|---|---|---|---|
| 5,140,571 A | * | 8/1992 | Nishida et al. | 369/44.11 |
| 5,345,347 A | * | 9/1994 | Hopkins et al. | 360/71 |
| 5,586,308 A | * | 12/1996 | Hawkins et al. | 713/501 |
| 5,691,948 A | * | 11/1997 | Sakabe | 365/227 |
| 6,118,306 A | | 9/2000 | Orton et al. | 327/44 |
| 6,122,131 A | | 9/2000 | Jeppson | 360/77.02 |
| 6,189,106 B1 | | 2/2001 | Anderson | 713/300 |
| 6,192,479 B1 | * | 2/2001 | Ko | 713/300 |
| 6,490,688 B1 | * | 12/2002 | Rosch | 713/322 |
| 6,665,802 B1 | * | 12/2003 | Ober | 713/320 |

FOREIGN PATENT DOCUMENTS

| | | |
|---|---|---|
| JP | 62-276838 | 12/1987 |
| JP | 8-125487 | 5/1996 |
| WO | WO99/46624 | 12/1999 |

* cited by examiner

*Primary Examiner*—Chun Cao
*Assistant Examiner*—Hari Patel
(74) *Attorney, Agent, or Firm*—Fliesler Meyer LLP

(57) ABSTRACT

Clock speed of the processor in a hard disk drive is controlled during run time to optimize the trade-off between minimizing power consumption and maximizing performance. Processor clock speed is increased during processing of code more performance critical to the disk drive system, while processor clock speed is reduced when less performance critical code is processed. An example of more critical code where processor clock speed is increased is the code executed by the processor from the start of a servo interrupt until output of resulting servo current command is provided from the processor to the actuator controller. To enable changing processor clock speed, an ASIC containing the disk drive processor is selected which provides the ability to switch clock rates of the processor during processor run time.

7 Claims, 2 Drawing Sheets

METHOD FOR OPERATING A PROCESSOR AT FIRST AND SECOND RATES DEPENDING UPON WHETHER THE PROCESSOR IS EXECUTING CODE TO CONTROL PREDETERMINED HARD DRIVE OPERATIONS

PRIORITY CLAIM TO PROVISIONAL APPLICATION

This patent application claims priority to U.S. Provisional Patent Application No. 60/436,752, filed Dec. 27, 2002.

BACKGROUND

1. Technical Field

The present invention relates to the design of hard disk drives to minimize power consumption while maintaining performance levels. More particularly, the present invention relates a technique for minimizing power consumption by one or more processors controlling the disk drive.

2. Related Art

A hard disk drive assembly is a mass-storage device from which data may be read and/or written. Typically the hard disk drive includes one or more randomly accessible rotatable storage media, or disks upon which data is encoded. In a magnetic disk drive, the data is encoded as bits of information using magnetic field reversals grouped in tracks on the magnetic hard surface of rotating disks. A transducer head supported by an actuator arm is used to read data from or write data to the disks. A voice control motor (VCM) attached to the actuator controls positioning of the actuator, and thus the transducer head position over a disk.

Data read from the disk or written to the disk is provided through circuitry to a processor. Servo position data read from the disk is processed by the processor, enabling the processor to provide servo current command signals to control the VCM for proper positioning of a transducer head relative to a disk When a hard drive system is intended to be mobile, and includes an internal battery, the system is typically set to operate at a low power level. With a low power, overall performance is typically sacrificed in return for maximizing battery life. For non-portable hard disk drives not requiring batteries, system power levels are not a significant issue and the system power levels can be set high to maximize performance.

One way to reduce power consumption is to reduce the core clock frequency of a component. Power varies approximately linearly with clock speed and by the square of voltage as evidenced by the following equation:

Power=(Total Capacitance×Frequency×Voltage$^2$)/2

The operation frequency, and thus power consumption can be linearly adjusted by reducing the clock rate. Adjusting both clock rate and system voltage level can produce approximately cubic reductions in power consumption.

However, it is also desirable to increase the performance level of the system by increasing the processor clock frequency. For a processor of a hard disk drive intended for a battery operated portable device, the processor clock rate is set to facilitate a compromise between reducing power to maintain battery life and maintaining a desired level of system performance.

SUMMARY

In accordance with the present invention, disk drive processor speed is changed during run time to optimize the trade-off between minimizing power consumption and maximizing performance. Changing processor speed satisfies the general desire to keep the processor frequency low so that the power consumption is low, while maintaining some critical operations at a fast run time because they significantly affect system performance.

In accordance with the present invention, processor clock speed is modified such that different parts of code running on the processor execute at different speeds. In particular, processor speed for executing certain code is related to how much the code affects performance of the drive. Code that is critical to performance is set to run faster than code that is not critical to performance.

One example of critical code is the code that starts from the assertion of the servo interrupt until the output of the servo current control signal from the processor to the VCM controller. In accordance with the present invention, during a time period between receipt of a servo interrupt and output of resulting servo current control information from the processor, the processor clock speed is maximized. To enable changing processor clock speed, an ASIC containing the processor is selected which provides the ability to switch clock rates of the processor during processor run time.

Another example of critical code is the code processed in a bottleneck between when the disk drive processor receives a command to transfer data, and when the processor starts the execution of a seek command. The seek command requires the actuator to move the head from the current track to a different track, and requires some time for the processor to generate, in part because the processor typically has to generate an appropriate destination from the transfer data command. This can result in a code bottleneck between the receipt of a transfer data command and start of the seek command.

BRIEF DESCRIPTION OF THE DRAWINGS

Further details of the present invention are explained with the help of the attached drawings in which.

DETAILED DESCRIPTION

Figure 1:
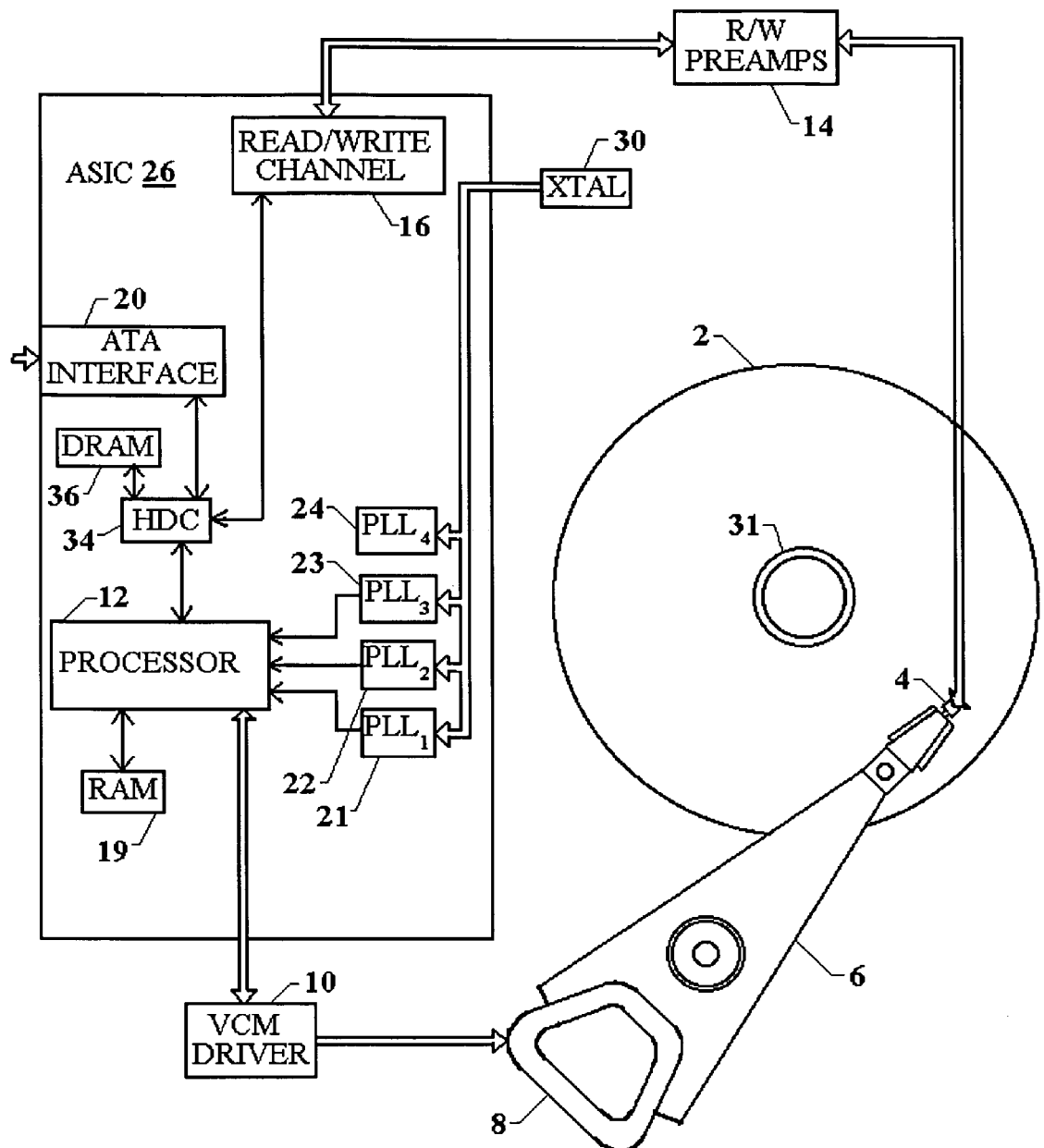
FIG. 1 shows a block diagram of components of a hard disk drive configured to minimize power consumption in accordance with the present invention.

FIG. 1 shows a block diagram of components of a hard disk drive system configured to minimize power consumption in accordance with the present invention. The hard disk drive includes a rotating disk 2 containing a magnetic medium for storing data in defined tracks. Data is written to or read from the storage medium using a transducer or read/write head 4 provided on an actuator 6. The actuator movement is controlled by a voice control motor (VCM) 8 made up of a magnet and a coil configured for receiving an external control signal.

Current is provided to the coil of the VCM to control the position of the actuator using a hard disk or VCM driver 10. The VCM driver 10 in turn receives current command signals from a processor 12, enabling the VCM driver 10 to apply an amount of current to the coil of the VCM 8 to position the actuator 6 over a desired track of the rotating disk 2.

The disk 2 contains multiple tracks where data is stored. The data is read from or written to the rotating disk 2 using the transducer head 4. The analog data read is provided through a read/write (R/W) pre-amplifier 14. The amplified read data is provided to the R/W channel 16, which includes circuitry to convert the data from analog to digital and decode the digital data to provide to the hard disk controller (HDC) 34. The R/W channel 16 further converts data received from the HDC to be written from digital to analog for providing through the R/W preamps 14 to transducer head 4. The data read includes servo data provided in digital form from the HDC 34 to the processor 12.

Servo data provided to the processor 12 includes information indicating track positioning of the transducer head 4 over the rotating disk 2. The track positioning information indicates the track the transducer head 4 is placed over, as well as any misalignment of the transducer head 4 relative to a track. Servo data is recorded periodically along each track on the rotating disk 2 between other non-servo data. The real-time servo control algorithm is typically run on an interrupt basis on the processor, with the interrupt being triggered, for example by servo demodulation hardware typically provided in the HDC 34. The interrupt causes the processor to cease other functions it is performing and deal with the servo position data. The processor 12 determines track misalignment and computes a current command which is sent to the VCM driver 10 to correct for the track misalignment. This interrupt is typically initiated approximately when all the servo position information contained in the servo wedge is read into the ASIC 20. It is well known that reducing the time between the position information written on the disk and the subsequent current command improves servo performance. Thus, enhancing the processor performance during the time from the start of the interrupt to the sending of the current command at the expense of additional power consumption is typically desirable.

Also, if it is desired to read data from or write data to other tracks on the rotating disk 2, the processor 12 executes code which generates a target position consistent with the desired read or write data and sends a request to the servo code to move from the current position to the new target position. The request to move the head from one location to another is typically called a seek. Because it improves performance to minimize the time from the receipt of the read or write command to the start of the seek, enhancing processor performance during execution of this code at the expense of additional power consumption is typically desirable.

Processor 12 executes instructions acquired from a stored control program to control disk drive functions. During startup, the control program is embedded in flash memory, or other non-volatile memory and then either executed directly, or loaded into a random access memory RAM 19 connected to the processor 12 and executed. Various firmware routines are stored in memory locations for controlling the operation of the actuator 6 and spindle motor 31. Here, control programs include the instructions the processor 12 executes, and tables, parameters or arguments used during the execution of these programs.

The processor 12 also communicates with the HDC 34 which has access to components external to the hard disk drive system through an advanced technology attachment (ATA) interface bus 20. The ATA bus 20 is also referred to as an integrated drive electronics (IDE) bus, and although specifically shown as an ATA bus, may be another type of external component interface, such as an SCSI, in accordance with the present invention. The HDC 34 further provides access to additional DRAM memory 36. Control programs for the processor may reside in DRAM 36, or in RAM 19 directly accessible by the processor.

For a hard disk drive, application specific integration circuits (ASICs) have been created to integrate a number of circuit components onto a single chip. One such ASIC 26 is illustrated in FIG. 1. As shown, the ASIC 26 integrates the processor 12, RAM 19, R/W channel 16, HDC 34, DRAM 36, and ATA interface bus 20 all onto a single chip. The chip for disk drive control is often referred to as a system on a chip (SOC). Although components such as the VCM driver 10 and the processor 12 are shown to be included on the single ASIC 26, it is understood that the present invention contemplates that the components may similarly be included as separate non-integrated circuits, or the processing functions can be distributed to other components such as the HDC 34. Further, although a single processor 12 is shown, it is understood that the functions of processor 12 can be divided among multiple processors when desirable.

For components requiring a clock, a crystal oscillator 30 is provided external to the ASIC 26. Although a crystal oscillator is shown, other types of oscillators may be used. An oscillator input signal is typically provided to one or more phase locked loops (PLLs) on an ASIC. The PLLs include frequency dividers to convert the frequency from the oscillator to the desired frequency for individual components on the ASIC. For the ASIC 26 illustrated in FIG. 1, four such PLLs 21–24 are shown.

On the ASIC 26, the PLLs 21–23 are shown providing a clock signal to the processor 12. Note that although the PLLs 21–23 are shown connected directly to the processor 12, many configurations are possible. For instance, the PLLs can be provided indirectly through the HDC 34 to the processor 12. The HDC 34 can then include a multiplexer controlled by the processor to select one of the PLL outputs to provide to the processor 12 at a time. In accordance with the present invention, code executing on the processor can select one of the desired clock signals depending on the frequency of operation desired. Code stored in the RAM 19, or other memory if present, selects different clock signals as desired. As an alternative to multiple PLLs 21–23, a single PLL, such as PLL 21, could be configured to provide the clock signal to the processor 12, with control signals provided to the PLL 21 to control its frequency division to selectively provide different clock signal frequencies to the processor 12. Multiple PLLs may, however, be desirable because of the time period required for a PLL to stabilize after its frequency divider is reset.

In accordance with the present invention, the clock signal frequency of the processor 12 is varied during processor run time to minimize power consumption, while maximizing performance. When clock frequency of the processor is reduced, power provided to the processor is also significantly reduced. To maximize performance, clock speed of the processor 12 is not reduced when performance critical code is executed by the processor 12.

In one embodiment, the performance critical code where clock speed is maximized is code starting from initial receipt of a servo interrupt until code is executed by the processor 12 causing a resulting current command signal to be sent to the VCM driver 10. The increased power consumption of the processor 12 from the start of the interrupt to the sending of the current command is considered desirable because it reduces phase loss due to control delays, improving overall servo performance.

Figure 2:
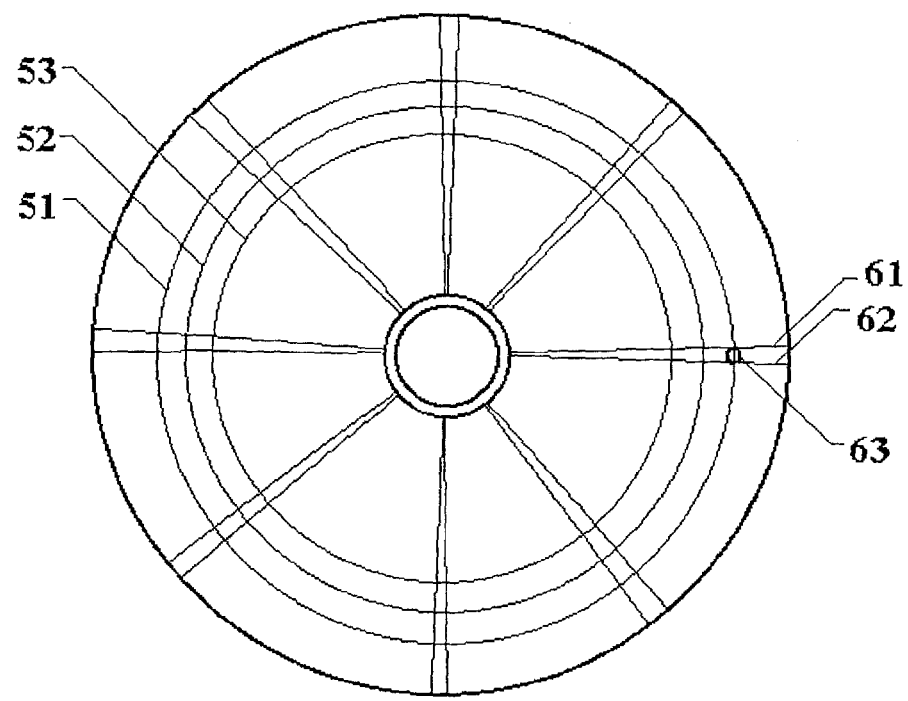
FIG. 2 illustrates the subdivision of tracks programmed on a hard disk into servo sectors.

To illustrate where servo data is stored on a disk in one embodiment of the present invention FIG. 2 illustrates a number of data tracks 51–53 programmed on a rotating disk. The tracks 51–53 are subdivided, such as between lines 61 and 62, to form servo sectors, such as sector 63, where servo data is written on a track. As shown, the servo sectors, such as sector 63, occur periodically around the tracks 51–53. The servo data read from servo sectors is received periodically, with equal time periods between reception of the servo sector bursts. In a system where the actuator arm rotates about a pivot point such as a bearing, the servo wedges may not extend linearly from inner diameter (ID) to outer diameter (OD), but may be curved slightly in order to adjust for the trajectory of the head as it sweeps across the disk.

Figure 3:
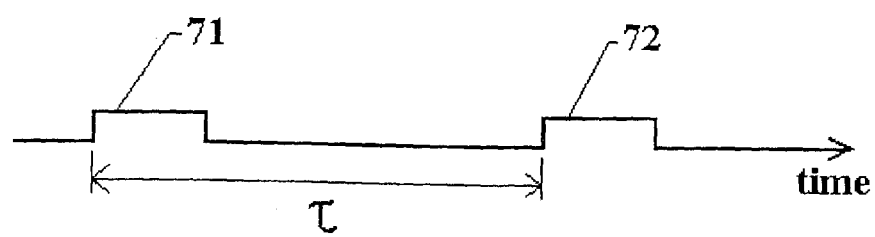
FIG. 3 shows a timing diagram illustrating the time from the start of the servo interrupt to the sending of the current command.

FIG. 3 shows a timing diagram illustrating a performance critical portion of the servo interrupt, namely the time from the start of the interrupt to the sending of the current command. Different such critical servo interrupt portions are executed periodically during time periods 71 and 72. The processor 12 typically receives a servo interrupt associated with a servo sector every time period $\tau$. The period $\tau$ is typically in the range of 20 to 200 μsec, and is influenced by the number of tracks per inch (TPI) which are recorded on the disk. Increasing TPI tends to decrease the period $\tau$ and servo performance, while a decrease in TPI tends to increase the period $\tau$ and servo performance. It is understood that some systems can have multiple servo interrupts for each servo sector, using a commonly known concept called multi-rate control. Between execution of servo interrupt code, the processor 12 executes other non-servo interrupt code. With servo interrupt code periodically executing, in accordance with the present invention, a first fast clock signal can be provided to the processor 12 between the start of the servo interrupt and the sending of the current command to improve disk drive performance, while a second slower clock signal can be provided to processor 12 when the rest of the servo interrupt code is executing to minimize power consumption by the processor 12. The faster clock reduces the time between the position data written on the disk passing under the head, and output of the servo control to the actuator. This means that phase loss due to control delay is reduced, a factor in improving servo performance. The clock can run slower at other times, including potentially the rest of the servo interrupt.

Figure 4:
FIG. 4 shows a diagram illustrating the time from the start of the servo interrupt to the sending of the current command as well as the time from the sending of the current command to the end of the servo interrupt.

FIG. 4 is a timing diagram that divides the servo interrupt into two sections. The first part, 81, illustrates the servo code execution time from the start of the interrupt to the sending of the current command. This is timing critical code and includes determining position and computing the current command signal. The second part, 82, illustrates the servo code execution time from the output of the current command signal from the processor to the end of the servo interrupt. Processor speed is essential during the first part 81, but processor speed during the second part 82 is not as essential. Thus, after servo current command is sent from processor 12 to the VCM driver 10, processor speed is reduced in one embodiment of the present invention to minimize power consumption during the rest of the interrupt 82. Upon initial receipt of a subsequent servo interrupt portion 81, processor speed is again increased. Code running as part of the interrupt increases and decreases the processor clock frequency as appropriate. Although the interrupt portion 81 is shown as approximately one quarter of the total servo interrupt, the relative time in portion 81 and 82 can vary significantly. The portion 81 accounts for a significant phase loss in the control system at the servo open loop crossover frequency (approximately 1 to 5 degrees), so increasing clock speed during the portion 81 provides a significant performance improvement with only a small increase in power.

As indicated previously, with a reduction in clock speed, processor power consumption is linearly reduced. For the embodiment described above, two or more different clock speeds may be used to optimize the tradeoff between minimizing power consumption and maximizing performance.

In another embodiment of the present invention, the processor speed is maximized when performance critical code is executed that is, in time, between the receipt of a read or write command through the host interface, such as the ATA interface, to code that is executed to cause a seek request to be sent. One aspect of the disk drive performance is to reduce the time between the receipt of the read or write command and the completion of such a command. The time from the receipt of the command and the start of the seek is a critical component of this overall time and thus performance. Consequently, increasing the processor clock frequency during the execution of this code can provide a significant increase in disk drive performance.

Depending on disk drive system requirements, it may be considered essential to process code other than code between the start of a servo interrupt and the sending of the current command or code between the receipt of a read or write command and the start of the seek at a fast clock speed without concern for power consumption. It may also be desirable to use intermediate clock speeds for some processing requirements. For instance, the system in accordance with the present invention contemplates use of a very low clock speed for a sleep mode when the drive is basically inoperative. In accordance with the present invention, it is contemplated that clock signals with faster speeds be provided to the processor during processing of some code when design considerations dictate that speed is preferable over processor power consumption. Further, although the present invention is described for use with hard disk drives for recording in magnetic media, it is understood that principles in accordance with the present invention can be used with optical disk drives.

Although the present invention has been described above with particularity, this was merely to teach one of ordinary skill in the art how to make and use the invention. Many additional modifications will fall within the scope of the invention, as that scope is defined by the following claims.

What is claimed is:

1. A method of controlling power consumption in a disk drive, the method comprising the steps of:
   controlling clock speed of a processor to operate at a first rate when the processor processes first code to control an operation of the disk drive wherein the first code comprises code starting from a start of a servo interrupt until a servo current command signal is provided from the processor to a hard disk controller to control position of an actuator; and
   controlling clock speed of the processor to operate at a second rate when the processor is processing second code to limit power consumption of the processor.

2. A method of controlling power consumption in a disk drive, the method comprising the steps of:
    controlling clock speed of a processor to operate at a first rate when the processor processes first code to control an operation of the disk drive wherein the first code comprises code ranging from a start of a data read code to code executed to cause a current command signal to be provided from the processor to a hard disk controller to cause a track seeking operation; and
    controlling clock speed of the processor to operate at a second rate when the processor is processing second code to limit power consumption of the processor.

3. The method of claim 1 wherein the second rate is applied when servo information is processed enabling the processor to set up for receipt of subsequent servo data.

4. The method of claim 2, wherein the track seeking operation causes movement of the actuator.

5. The method of claim 1, further comprising:
    controlling clock speed of a processor to operate at a third rate when the processor processes second code to control an operation of the disk drive wherein the third code comprises code ranging from a start of a data read code to code executed to cause a current command signal to be provided from the processor to a hard disk controller to cause a track seeking operation.

6. The method of claim 5, wherein the first rate and the third rate are substantially equal.

7. The method of claim 5, wherein the first rate and the third rate are greater than the second rate.

* * * * *